US008919967B2

(12) United States Patent
Lu et al.

(10) Patent No.: US 8,919,967 B2
(45) Date of Patent: Dec. 30, 2014

(54) MICRO PROJECTION SYSTEM (75) Inventors: Ho Lu, Baoshan Township, Hsinchu County (TW); Shih Po Yeh, Baoshan Township, Hsinchu County (TW)

(73) Assignees: Ho Lu, Hsinchu County (TW); Cynosure Photonics Corp., Hsinchu County (TW)

( * ) Notice: Subject to any disclaimer, the term of this patent is extended or adjusted under 35 U.S.C. 154(b) by 401 days.

(21) Appl. No.: 13/482,997

(22) Filed: May 29, 2012

(65) Prior Publication Data

US 2012/0307213 A1    Dec. 6, 2012

(30) Foreign Application Priority Data

Jun. 3, 2011  (TW) .............................. 100119508 A (51) Int. Cl.
| G03B 21/14 | (2006.01) |
| G03B 21/28 | (2006.01) |
| G02B 17/04 | (2006.01) |
| G02B 27/28 | (2006.01) |
| G02B 27/12 | (2006.01) |
| G02B 27/14 | (2006.01) |
| G03B 21/20 | (2006.01) |
| G02B 27/10 | (2006.01) |
| G02B 27/09 | (2006.01) |
| G02B 5/04 | (2006.01) |
| G03B 33/10 | (2006.01) |

(52) U.S. Cl.
CPC ............ *G03B 21/2013* (2013.01); *G02B 27/10* (2013.01); *G02B 27/283* (2013.01); *G02B 27/1026* (2013.01); *G02B 27/126* (2013.01); *G02B 27/145* (2013.01); *G02B 27/149* (2013.01); *G02B 27/0955* (2013.01); *G02B 27/0972* (2013.01); *G02B 5/045* (2013.01); *G02B 27/0977* (2013.01); *G03B 21/2033* (2013.01); *G03B 21/2066* (2013.01); *G03B 21/2073* (2013.01); *G03B 21/208* (2013.01); *G03B 33/10* (2013.01)
USPC ................... 353/81; 353/20; 353/33; 353/38; 359/438; 359/485.06; 359/638; 359/640; 359/583

(58) Field of Classification Search
CPC ...... G03B 21/00; G03B 27/10; G03B 27/283; G03B 27/1026; G03B 27/126; G03B 27/145; G03B 27/149; G03B 27/0955; G03B 27/0972; G03B 5/045; G03B 27/0977; H04N 9/3167; H04N 13/0443
USPC ............. 353/20, 38, 33, 81; 359/438, 485.06, 359/638, 640, 583
See application file for complete search history.

(56) References Cited

U.S. PATENT DOCUMENTS

| 2003/0038923 A1* | 2/2003 | Aastuen et al. .................. 353/31 |
| 2004/0130681 A1* | 7/2004 | Aastuen et al. .................. 353/20 |

(Continued)

*Primary Examiner* — William C Dowling
*Assistant Examiner* — Magda Cruz
(74) *Attorney, Agent, or Firm* — Leong C. Lei (57) ABSTRACT

A micro projection system includes a primary prism as a light guide device. The primary prism has a bottom face and two slope faces. A light source module and a collimation lens are arranged at the bottom face of the primary prism to project red, green, and blue lights onto one of the slope faces of the primary prism to be consolidated by a wedge prism group and reflected toward a polarization beam splitting wedge prism arranged at another slope face, where the light is split into two polarized lights that are then emitted out of the primary prism to be processed and combined as light of consistent polarization by a lens array and a polarization conversion film so as to facilitate condensation and projection of the light by a polarization beam splitter and a projection lens.

9 Claims, 7 Drawing Sheets

(56) References Cited

U.S. PATENT DOCUMENTS

| | | | |
|---|---|---|---|
| 2006/0103812 A1* | 5/2006 | Liao et al. | 353/81 |
| 2006/0139575 A1* | 6/2006 | Alasaarela et al. | 353/31 |
| 2010/0328623 A1* | 12/2010 | Takahashi | 353/81 |
| 2012/0050859 A1* | 3/2012 | Lu et al. | 359/485.05 |
| 2012/0140184 A1* | 6/2012 | Bruzzone | 353/20 |
| 2012/0307213 A1* | 12/2012 | Lu et al. | 353/81 |

* cited by examiner

MICRO PROJECTION SYSTEM

TECHNICAL FIELD OF THE INVENTION

The present invention generally relates to a micro projection system, and more particularly to a micro projection system fit for use with digital devices and is either built in or externally coupled to a mobile phone, a camera, and a digital video (DV) device for immediate review and inspection of image(s) taken and also for playback of files of computer systems.

DESCRIPTION OF THE PRIOR ART

Most of the mobile phones that are currently available in the market are provided with functions of photographing and videotaping. Also, videotaping is also an essential function of the modern cameras. Review and inspection of the pictures or films taken by a mobile phone, a camera, or a digital video device are only available on a screen of the device, which is a miniature one, or connection must be made with a computer for further review and inspection. Additionally, a projector may be used to project the images or films for watching by a number of people at the same time. Apparently, the operation of reviewing a static picture or dynamic photographing is still troublesome and inconvenient, for watching of a projected image cannot be made immediately after the picture or film is taken. This is simply because of issues of miniaturization of the size of projection system and supply of sufficient brightness for bare eye observation of the image in good quality for operation in low power of the device are generally not overcome so far. These are the most apparent technical bottle necks to be addressed in the industry.

Figure 8:
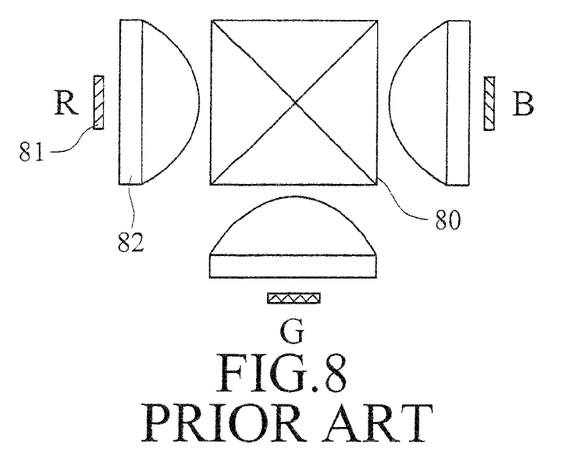
FIG. 8 is a schematic view showing a first conventional projection structure.
Figure 9:
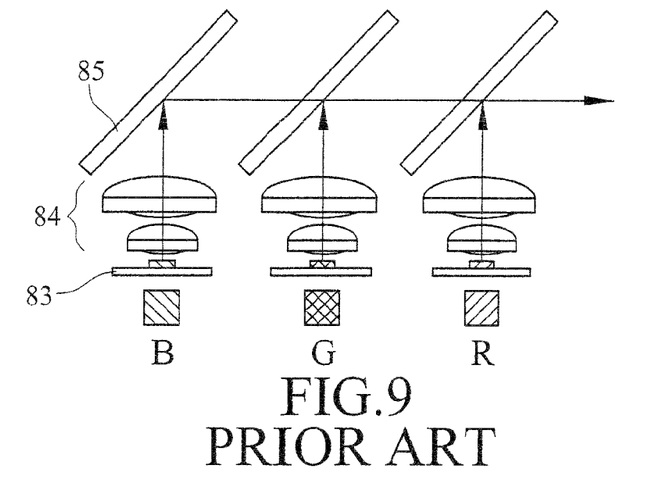
FIG. 9 is a schematic view showing a second conventional projection structure.
Figure 10:
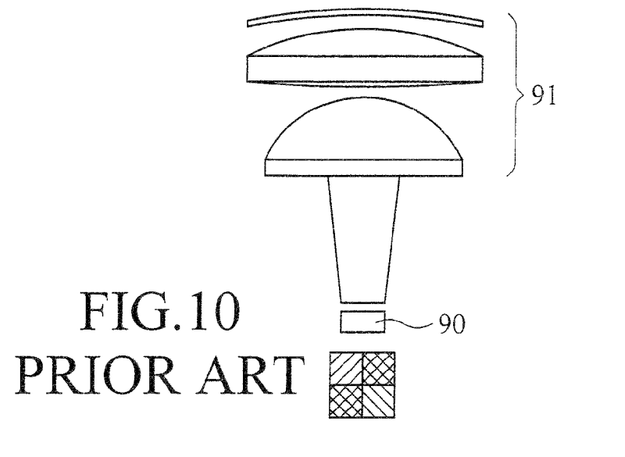
FIG. 10 is a schematic view showing a third conventional projection structure.

For the issue of insufficiency of brightness, light consolidation can be applied to colors of light to concentrate the illuminating area of the light source to facilitate collection of projection light and this is the most common solution. As shown in FIG. 8, which is a schematic view showing a conventional color light consolidation device of projection system, a square prism 80 is provided at each of three side faces thereof with a set of light-emitting diode 81 (which is often red R, green G, and blue B) and a lens assembly 82. The lens assembly 82 projects the light emitting from the respectively light-emitting diode 81 in a collimated manner into the prism 80. Also, in FIG. 8, the red (R) light, the blue (B) light, and the green (G) light respectively from the left hand side, the right hand side, and the rear side are combined in the prism 80 and then projected from the front side. Such a projection system is disadvantageous in that a large amount of space is occupied and this is adverse against use in a micro projection system. Further, excessively high cost is another disadvantage. FIG. 9 shows a different conventional device, where combinations of light-emitting diode 83 and lens 84 are each arranged to project light through a dichroic mirror 85 for light combination and projection. Again, disadvantages of for example occupying large amount of space and being complicated and thus being hard to manufacture exist. FIG. 10 shows a further conventional device, in which a plurality of light-emitting diodes 90 (such as four light-emitting diodes respectively of red, blue, green, and green lights) is arranged at one end of a special lens assembly 91 in order to project an image from an opposite end. This known arrangement occupies a relatively small amount of space, but the illuminating area of the light source is not concentrated sufficiently so that the brightness of the image is poor, this being a primary disadvantage.

Further, a conventional liquid crystal projector comprises a complicated polarization conversion device. However, a micro projector is limited by the size thereof to include the polarization conversion device, whereby in a projection operation, one half of polarized light that enters a polarization beam splitter cannot be used. This leads to a loss of light and results in insufficiency of brightness, which is a primary drawback of the conventional devices.

SUMMARY OF THE INVENTION

The primary object of the present invention is to provide a micro projection system that overcomes the above discussed disadvantages and drawbacks of the conventional devices.

To achieve the object, the present invention provides a micro projection system that comprises a primary prism as a light guide device. The primary prism has a bottom face and two slope faces. A light source module and a collimation lens are arranged at the bottom face of the primary prism to project red, green, and blue lights onto one of the slope faces of the primary prism to be consolidated by a wedge prism group and reflected toward a polarization beam splitting wedge prism arranged at another slope face, where the light is split into two polarized lights that are then emitted out of the primary prism to be processed and combined as light of consistent polarization by a lens array and a polarization conversion film so as to facilitate condensation and projection of the light by a polarization beam splitter and a projection lens.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
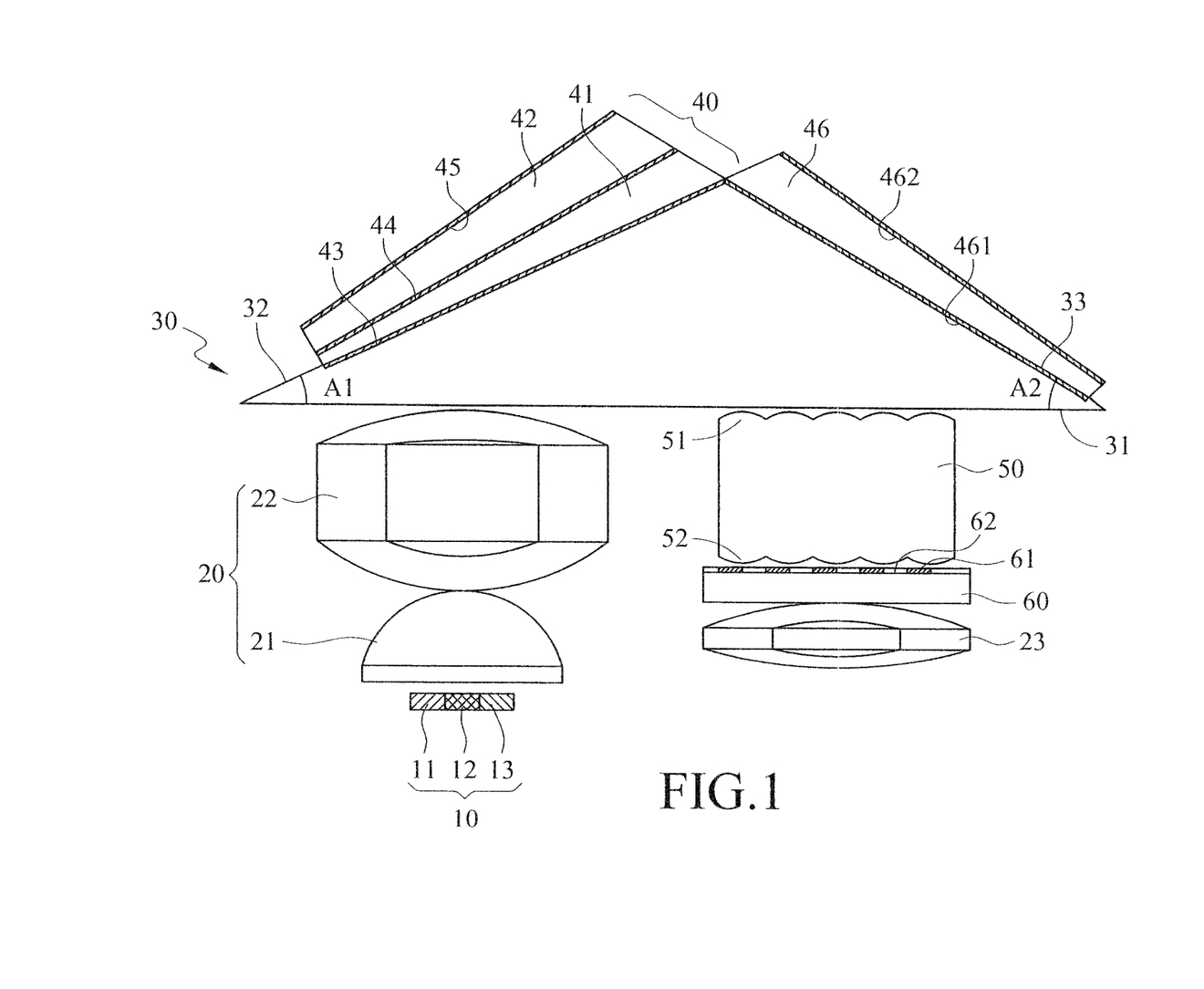
FIG. 1 is a schematic view showing the structure of the present invention.

Referring to FIG. 1, the present invention comprises at least:

A primary prism 30 has a bottom face 31 and two slope faces 32, 33 and is basically of a triangular prism. The bottom face 31 and the two slope faces 32, 33 form therebetween included angle A1, A2, respectively, which are preferably between 20 to 40 degrees in order to provide a better reflection angle. However, for the sake of safety each corner can be made chamfered or rounded that does not affect the transmission of light in accordance with the present invention.

A wedge prism group 40 comprises at least a first wedge prism 41 and a second wedge prism 42, which are stacked on the slope face 32 of the primary prism 30. Coating layers 43, 44, 45 are respectively formed between the primary prism 30 and the first wedge prism 41, between the first and second wedge prisms 41, 42 and on an outside surface of the second wedge prism 42 to transmit or reflect specific lights. These coating layers 43, 44, 45 can be replaced by equivalent sticking films.

A polarization beam splitting wedge prism 46 is mounted to another slope face 33 of the primary prism 30 and a polarization beam splitting film layer 461 is formed between the slope face 33 and the polarization beam splitting wedge prism 46. A reflective layer 462 is formed on an outside surface of the polarization beam splitting wedge prism 46.

A light source module 10 and a collimation lens 20 are arranged outside the bottom face 31 of the primary prism 30 at a location corresponding to a portion of the bottom face that is substantially opposite to the wedge prism group 40. The light source module 10 comprises at least single color light sources 11, 12, 13 respectively of red, green, and blue colors to emit lights that travel through the collimation lens 20 to get incident into the primary prism 30.

Based on optic requirements, the collimation lens 20 may comprises a first lens 21 and a second lens 22 to collimate the light to project onto the primary prism 30.

Figure 2:
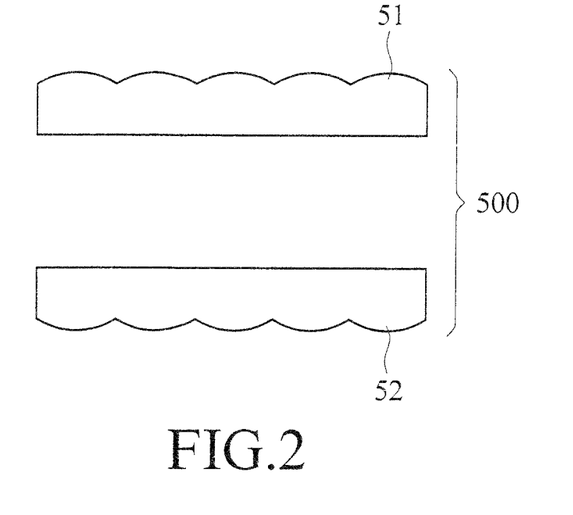
FIG. 2 is a schematic view showing another embodiment of lens array.

A lens array 50 has two ends each forming a plurality of closely arranged lens units 51, 52. The lens array 50 can be replaced, in an equivalent manner, by two separate lens arrays, as shown in FIG. 2, wherein the two-part lens array 500 also comprises the lens units 51,52 discussed above and may provides advantages of saving material and reducing weight when the distance between the two parts is great.

Figure 3:
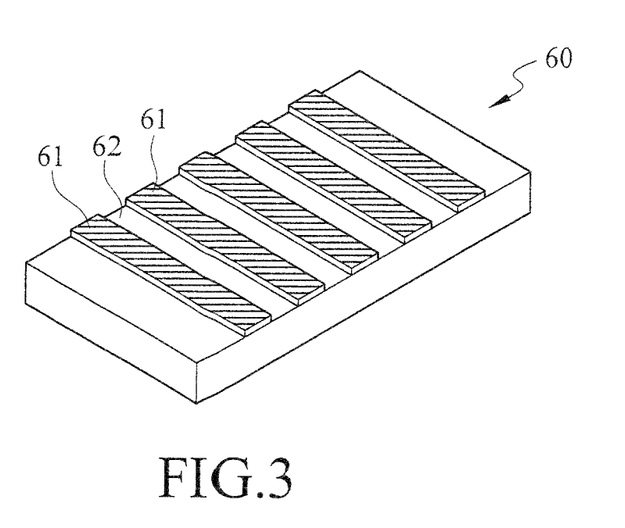
FIG. 3 is a perspective view showing the structure of polarization conversion film according to the present invention.

A polarization conversion film 60 is set at a location just under the lower lens units 52 of the lens array 50. As shown in FIGS. 1 and 3, the polarization conversion film 60 has a surface provided with a plurality of spaced phase retarding stripes thereby forming polarization conversion zones 61 having the property of phase reretardation and light transparent zone 62 inducing no phase change. The polarization conversion zones 61 and the light transparent zones 62 each take half of the area of each of the lens units of the lens array 52 (as shown in FIG. 1, no additional reference being provided). Further, the phase retarding stripes of the polarization conversion zones 61 show the behavior of half-wave plate and the phase retardation axis of the phase retarding stripes and the polarization direction of electric field of polarized light show an included angle of 45 degrees or 135 degrees.

A condensing lens 23 is arranged on the back side of the polarization conversion film 60 to effectively collect or condense light transmitting through the polarization conversion film 60.

Figure 4:
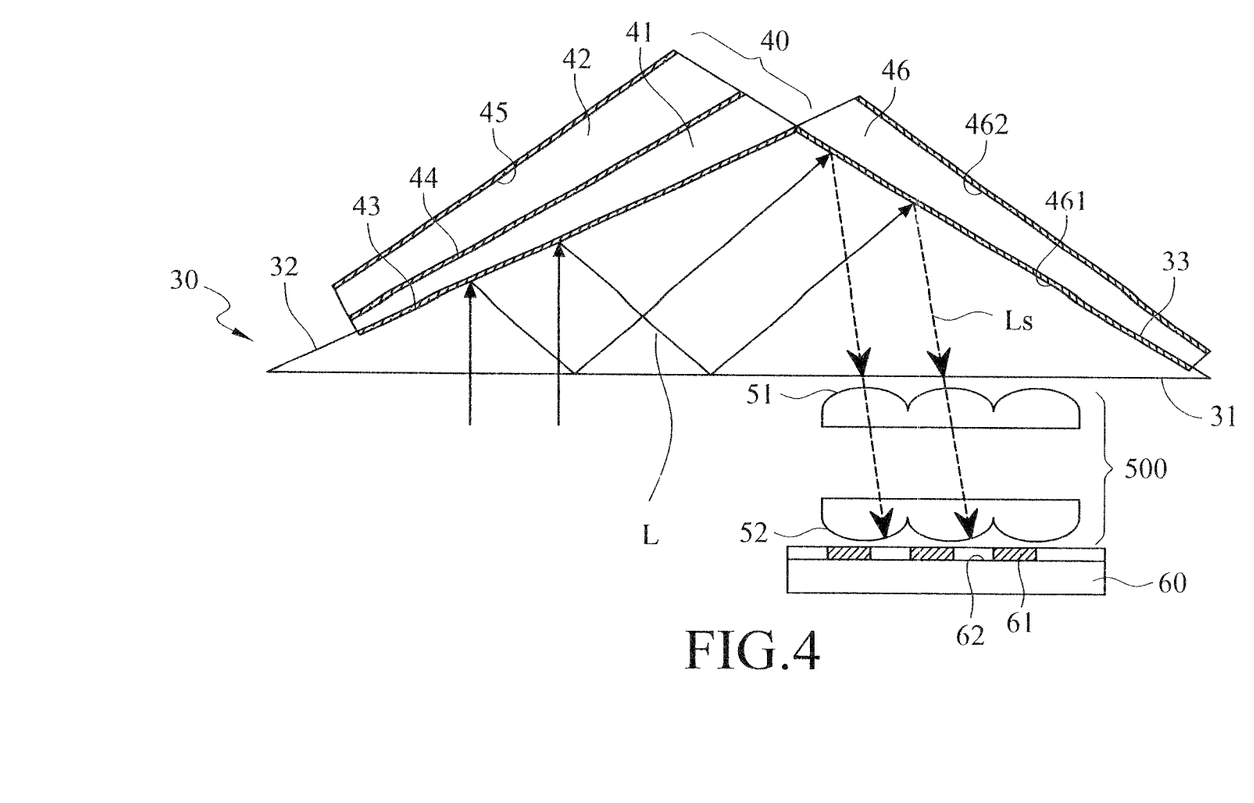
FIG. 4 is a schematic view showing light transmitting through a polarization beam splitting wedge prism according to the present invention.
Figure 5:
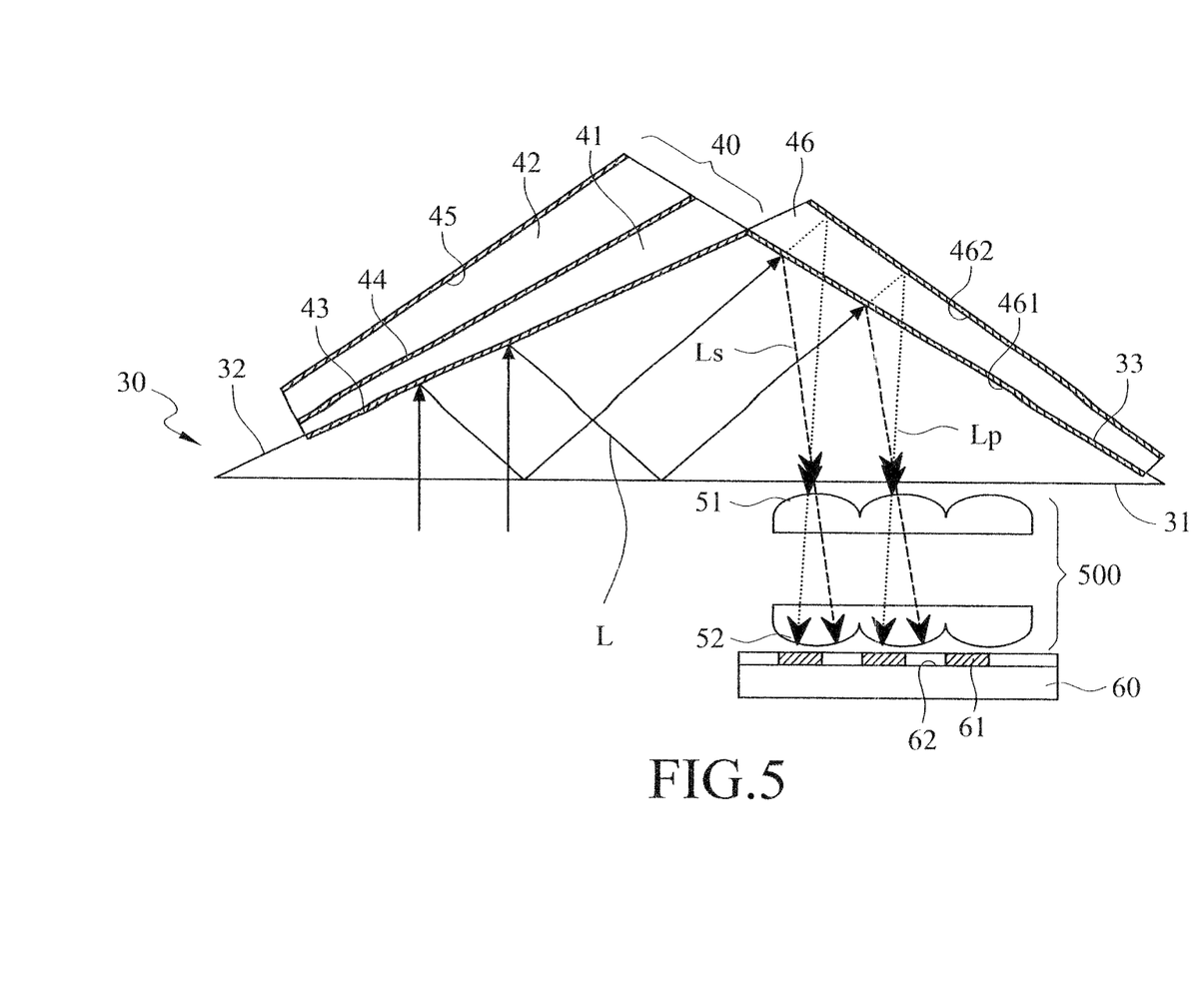
FIG. 5 is another schematic view showing light transmitting through a polarization beam splitting wedge prism according to the present invention.
Figure 6:
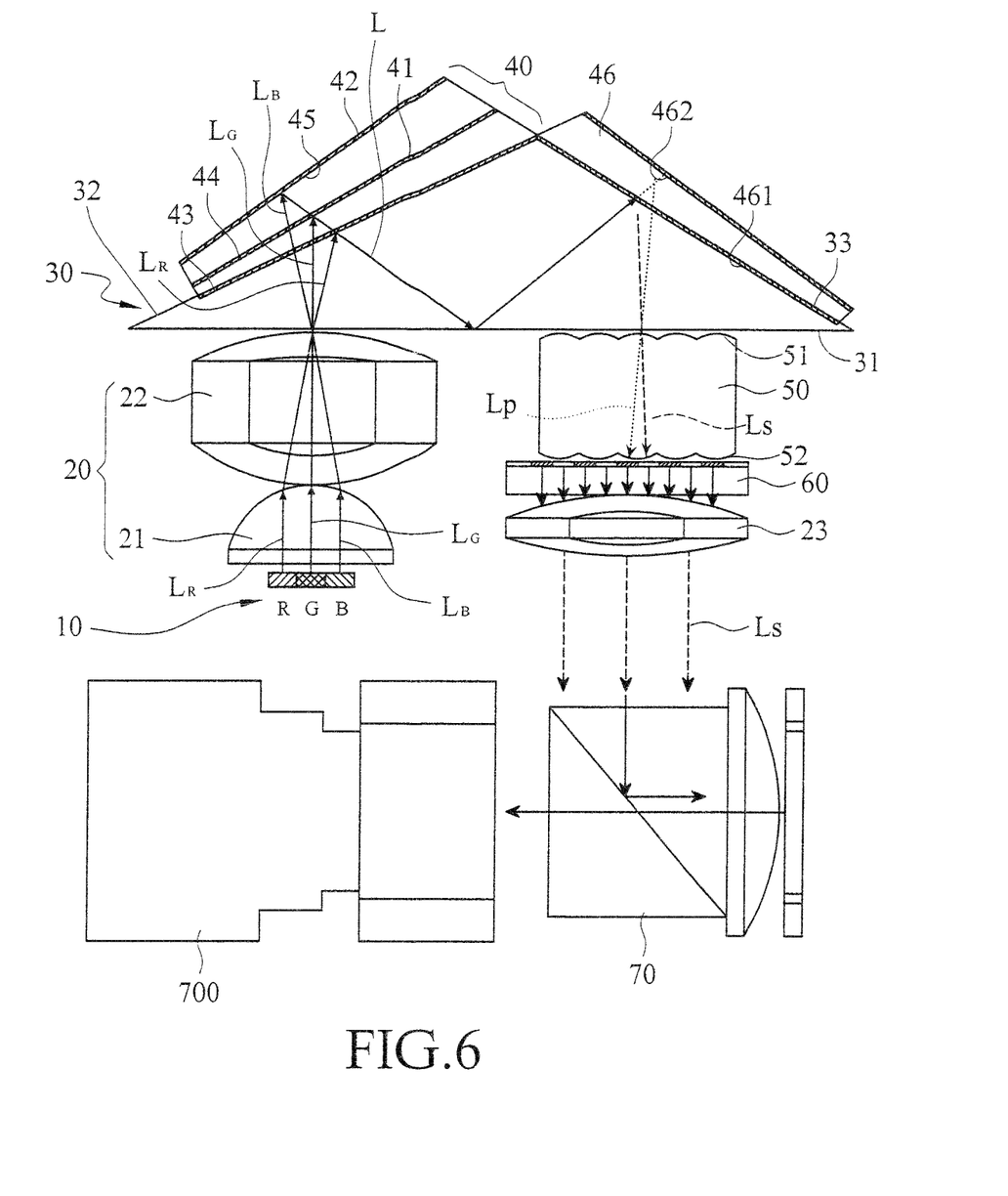
FIG. 6 is a schematic view showing an embodiment of the present invention together with a polarization beam splitter and a projection lens.

Referring to FIGS. 1 and 6, red, green, and blue lights emitting from the single-color light sources 11, 12, 13 of the light source module 10 transmit through the collimation lens 20 and respectively become collimated red, green, and blue lights $L_R$, $L_G$, $L_B$ that transmit through the bottom face 31 of the primary prism 30 and get incident into the wedge prism group 40. Due to the coating layers 43, 44, 45 of the wedge prism group 40 that are respectively formed between the primary prism 30 and the first wedge prism 41, between the first and second wedge prisms 41, 42, and on the outside surface of the second wedge prism 42, in which the coating layers 43, 44, 45 of the instant embodiment, in sequence from inside to outside, are respectively reflective of the red, green, and blue lights $L_R$, $L_G$, $L_B$, but allowing the remaining lights to transmit, the red, green, and blue lights $L_R$, $L_G$, $L_B$ are consolidated in the wedge prism group 40 to form a consolidated light L, which is subjected to total internal reflection by the bottom face 31 of the primary prism 30 to travel toward the opposite slope face 33 of the primary prism 30 to be projected onto the polarization beam splitting wedge prism 46. A polarization beam splitting film layer 461 and a reflective layer 462 are respectively formed between the slope face 33 of the primary prism 30 and the polarization beam splitting wedge prism 46 and on an outside surface of the polarization beam splitting wedge prism 46. In the embodiment illustrated, the polarization beam splitting film layer 461 reflects a polarized light $L_S$ but allows another polarized light $L_P$ to transmit (these polarized lights being P polarization light and S polarization light). As shown in FIG. 4, the consolidated light L gets incident, at the slope face 33 of the primary prism 30, into the polarization beam splitting layer 461, whereby the polarized light $L_S$ reflects and the polarized light $L_P$ transmits through the layer and then reflects at the reflective layer 462 (see FIG. 5). The two polarized lights $L_S$, $L_P$, after being reflected, are projected outward from the bottom face 31 of the primary prism 30.

Referring to FIGS. 1 and 4,5, the two polarized lights $L_S$, $L_P$ then enter the lens array 50, 500. For the purposes of easy illustration of the present invention, the lens arrays 50, 500 of FIGS. 1 and 4,5 are respectively shown as a single piece and two pieces, but they are of the same functionality. The first polarized light $L_S$, after transmitting through the lens units 51, 52, passes through the light transparent zones 62 of the polarization conversion film 60 to get into the condensing lens 23 and then project outward. The second polarized light $L_P$, after transmitting through the lens units 51, 52, passes through the polarization conversion zones 61 of the polarization conversion film 60 so as to convert the polarized light $L_P$ into another component of polarized light $L_S$, which then get into the condensing lens 23 and projects outward. As shown in FIG. 6, all the lights are now converted into polarized lights $L_S$, which are then directed to ward a polarization beam splitter (PBS) 70 and a projection lens 700 to be sufficiently collected and projected as consistently polarized light $L_S$ of high brightness.

Figure 7:
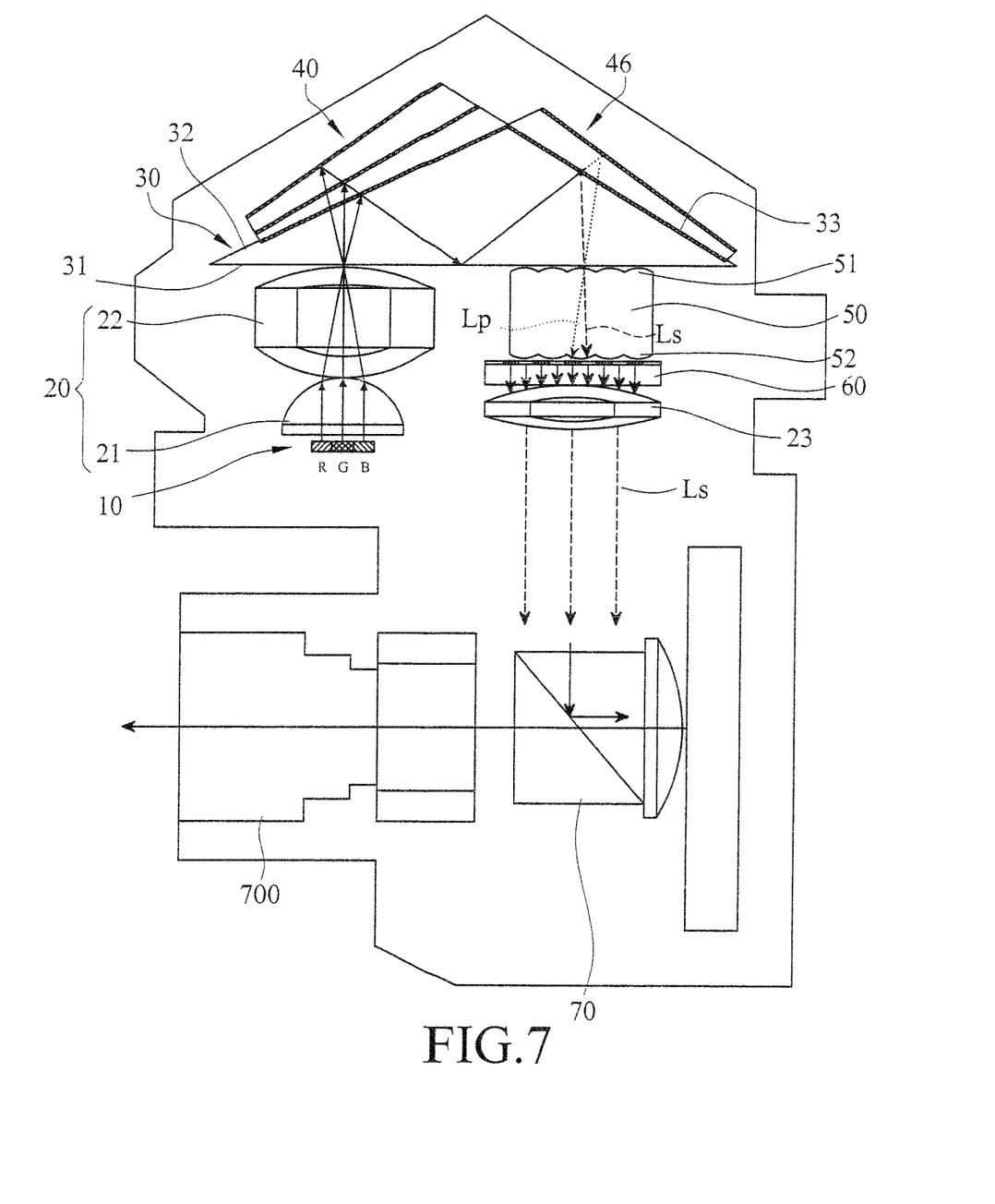
FIG. 7 is a schematic view showing a practical application of the present invention.

As shown in FIG. 7, a schematic view illustrating an example arrangement of the present invention is given. Practice made according to the present invention provides maximum dimensions of length/width/height in a completely assembled as a pico projector engine size to be 3.57 cm×2.2 cm×0.6 cm=4.7 cc, which is an extremely small volume, but the projection shows excellent brightness. This is the one of the primary advantages of the present invention.

Further, since the present invention uses the primary prism 30, the wedge prism group 40, and the polarization beam splitting wedge prism 46 to first consolidates the red, green, and blue lights $L_R$, $L_G$, $L_B$, which consolidated light is the split through polarization, and the polarized lights are subsequently combined through the lens array 50 and the polarization conversion film 60, whereby excellent effect of light condensation can be achieved with the minimum size and the condensed light is not easily spread with all components of polarized light power being used. This is another advantage of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A micro projection system, comprising at least:
   a primary prism, which has a bottom face and two slope faces;
   a wedge prism group, which comprises at least a first wedge prism and a second wedge prism, which are stacked on one of the slope faces of the primary prism, coating layers being respectively formed between the primary prism and the first wedge prism, between the first and second wedge prisms, and on an outside surface of the second wedge prism to selectively reflects or transmits specific lights therethrough;
   a polarization beam splitting wedge prism, which is arranged on the other one of the slope surfaces of the primary prism, a polarization beam splitting film layer being formed between said the other one of the slope faces of the primary prism and the polarization beam splitting wedge prism, a reflective layer being formed on an outside surface of the polarization beam splitting wedge prism;
   a light source module and a collimation lens, which are arranged outside the bottom face of the primary prism corresponding to a portion of the bottom face that is opposite to the wedge prism group, the light source module comprising single-color light sources of at least red, green, and blue lights, which are allowed to transmit through the collimation lens to get into the primary prism;
   a lens array, which has two ends respectively forming a plurality of closely arranged lens units; and
   a polarization conversion film, which is arranged under lower lens units of the lens array, the polarization conversion film having a surface provided with a plurality of spaced phase retarding stripes thereby forming polarization conversion zones having the property of phase retardation and light transparent zone inducing no phase change.

2. The micro projection system according to claim 1, wherein the collimation lens comprises a first lens and a second lens.

3. The micro projection system according to claim 1, wherein the lens array comprises two separate lens arrays.

4. The micro projection system according to claim 1, wherein the lens array opposes the polarization conversion film and the polarization conversion zones and the light transparent zones of the polarization conversion film each take a half of area of each of the lens units of the lens array.

5. The micro projection system according to claim 1, wherein the phase retarding stripes of polarization conversion zones of the polarization conversion film show the behavior of half-wave plate and phase retardation axis of the phase retarding stripes and polarization direction of electric field of polarized light show an included angle of 45 degrees or 135 degrees.

6. The micro projection system according to claim 1, wherein a condensing lens is arranged on the side of the polarization conversion film that is away from the polarization conversion film.

7. The micro projection system according to claim 1, wherein the primary prism comprises a triangular prism.

8. The micro projection system according to claim 1, wherein the bottom face of the primary prism forms included angles with respect to the two slope faces, which are between 20 to 40 degrees.

9. A micro projection system, comprising at least:
   a primary prism, which has a bottom face and two slope faces;
   a wedge prism group, which comprises at least a first wedge prism and a second wedge prism, which are stacked on one of the slope faces of the primary prism, coating layers being respectively formed between the primary prism and the first wedge prism, between the first and second wedge prisms, and on an outside surface of the second wedge prism to selectively reflects or transmits specific lights therethrough;
   a polarization beam splitting wedge prism, which is arranged on the other one of the slope surfaces of the primary prism, a polarization beam splitting film layer being formed between said the other one of the slope faces of the primary prism and the polarization beam splitting wedge prism, a reflective layer being formed on an outside surface of the polarization beam splitting wedge prism;
   a light source module and a collimation lens, which are arranged outside the bottom face of the primary prism corresponding to a portion of the bottom face that is opposite to the wedge prism group, the light source module comprising single-color light sources of at least red, green, and blue lights, which are allowed to transmit through the collimation lens to get into the primary prism;
   a lens array which has two ends respectively forming a plurality of closely arranged lens units;
   a polarization conversion film, which is arranged under lower lens units of the lens array, the polarization conversion film having a surface provided with a plurality of spaced phase retarding stripes thereby forming polarization conversion zones having the property of phase retardation and light transparent zone inducing no phase change;
   a condensing lens, which is arranged on the side of the polarization conversion film that is away from the polarization conversion film; and a polarization beam splitter and a projection lens, which receive light from the condensing lens and then projects outward.

* * * * *